July 15, 1952  C. A. GUSTAFSON  2,603,531
SIDE DUMPING TRAILER AND DRAFT CONNECTION THEREFOR
Filed May 18, 1950  3 Sheets-Sheet 3
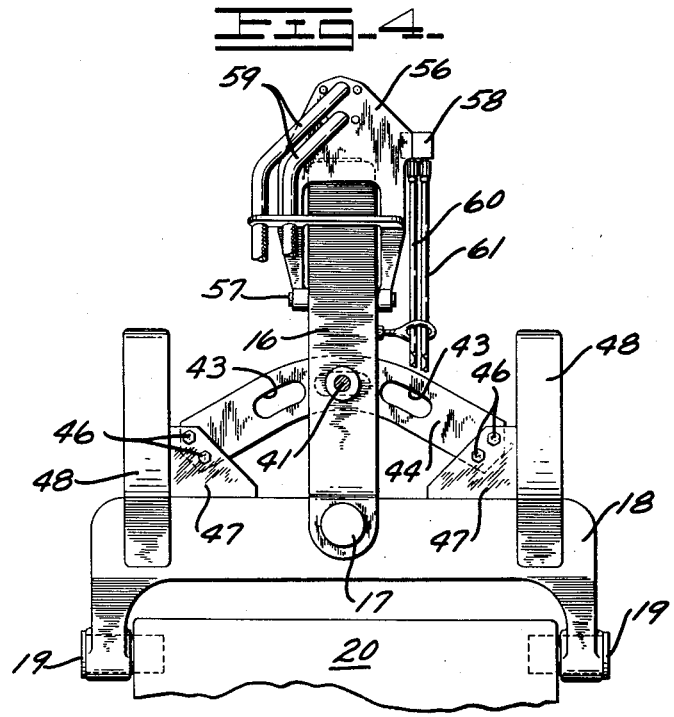
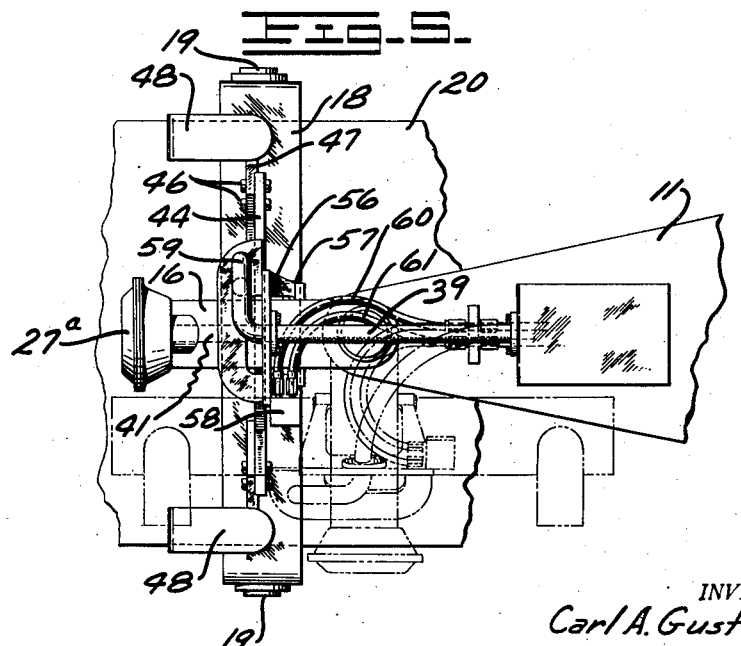
INVENTOR.
Carl A. Gustafson
BY Charles M. Fryer
ATTORNEY Patented July 15, 1952

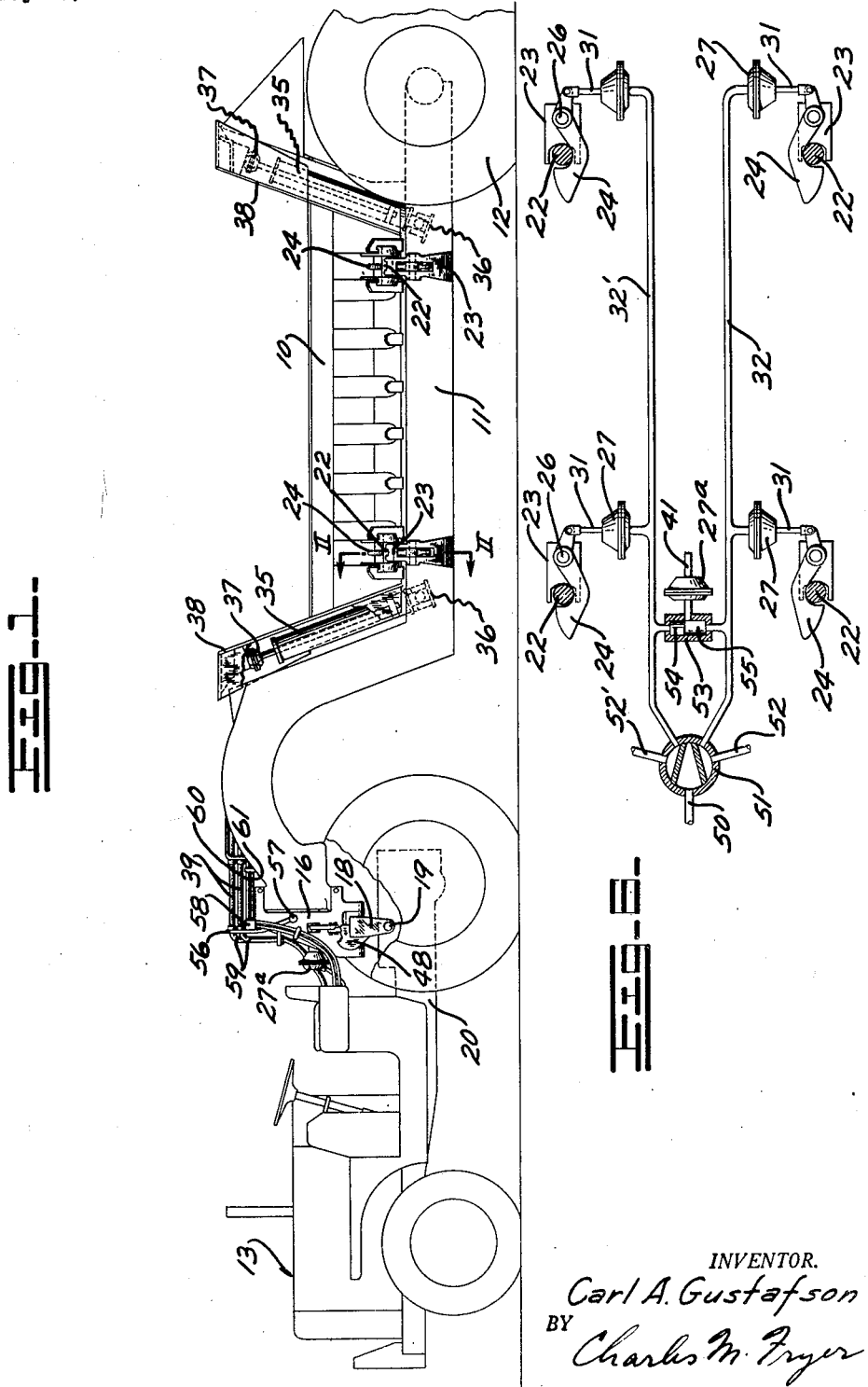

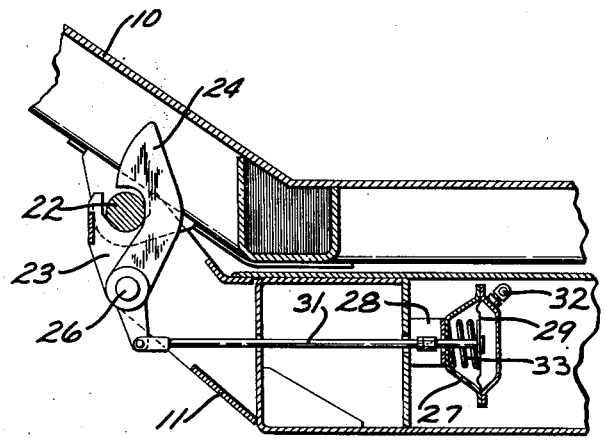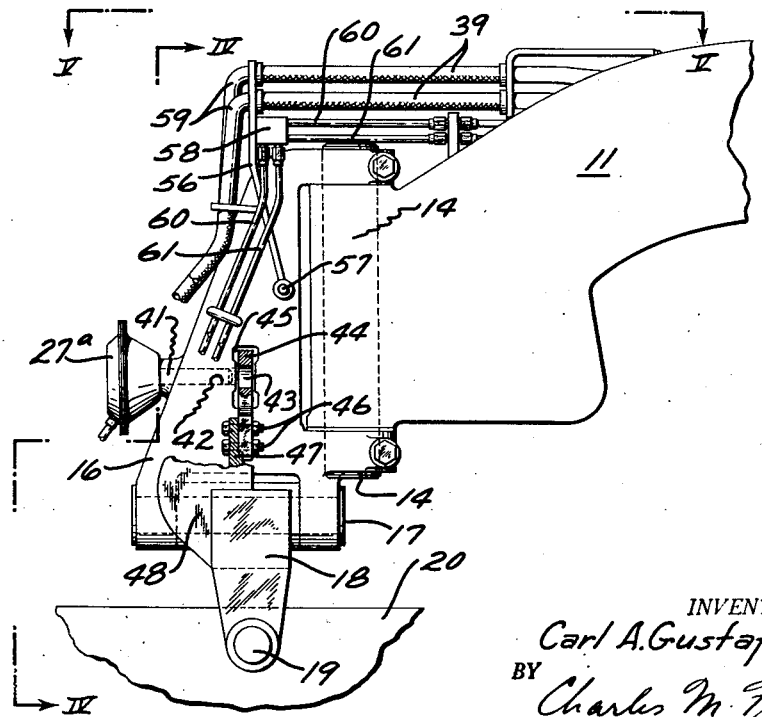

2,603,531

UNITED STATES PATENT OFFICE 2,603,531

SIDE DUMPING TRAILER AND DRAFT CONNECTION THEREFOR

Carl A. Gustafson, Peoria, Ill., assignor to Caterpillar Tractor Co., Peoria, Ill., a corporation of California Application May 18, 1950, Serial No. 162,780

7 Claims. (Cl. 298—18)

1

The present invention relates to large, heavy duty, side dump trailers of the type commonly drawn behind a tractor or the like and employed for hauling large quantities of earth or rock.

The invention is particularly useful in connection with two-wheeled, side dump trailers which are supported at one end on the draft vehicle and will be disclosed herein in connection with such use.

Side dump trailers usually comprise an earth receiving body carried on a frame, one end of which is supported on a pair of ground engaging wheels and the opposite end on the draft vehicle. The body is normally secured to the frame by releasable latches disposed on each side of the body. To dump the contents of the body, the latches on one side are released and the body is tipped about the latches on the opposite side by means of a suitable lifting mechanism such as hydraulic jacks. Thus, to dump the body, it is necessary for the operator to bring the draft vehicle to a stop, dismount and disengage the latches on one side of the body prior to tipping the body. These operations cause an excessive loss of time materially decreasing the number of loads carried per working shift. Another difficulty encountered is that the necessity of providing a connection between the tractor and trailer to permit relative lateral rocking movement during travel over uneven surfaces also allows the trailer to tip over on its side during dumping operations. This condition is also the source of frequent delays as well as damage to the trailer.

It is, therefore, an object of the present invention to provide an improved dumping trailer of the type described having means operable from the driver's position for releasing the latches that secure the body to its supporting frame to enable the operator to tilt the dump body without leaving his normal driving position.

Another object of this invention is to provide latch means operable from the operator's position to lock the trailer frame against lateral tipping relative to the draft vehicle during the time that the dump body is being tilted.

Other objects and advantages of this invention will be made apparent in the following description wherein reference is made to the accompanying drawings.

In the drawings:

Fig. 1 is a view in side elevation of a tractor and dumping trailer embodying the present invention;

Fig. 2 is a fragmentary sectional view taken along line II—II of Fig. 1;

Fig. 3 is an enlarged fragmentary view in side elevation of the tractor hitch shown in Figure 1 with parts broken away to more clearly illustrate the anti-tipping mechanism;

2

Fig. 4 is a fragmentary view taken along the line IV—IV of Fig. 3;

Fig. 5 is a fragmentary plan view of the trailer and tractor hitch indicated by the line V—V in Fig. 3; and Fig. 6 is a view illustrating schematically the fluid circuit for actuating the latch mechanisms.

In Fig. 1 a dumping trailer embodying the present invention is illustrated as comprising an earth receiving body 10 carried on a frame 11 which at its trailing end is supported on a pair of ground engaging wheels, one of which is illustrated at 12. At its opposite end, the trailer is connected to a suitable draft vehicle such as a wheel type tractor indicated generally at 13. The trailer is connected to the tractor by a universal connection comprising a pin 14 (Fig. 3) providing a pivotal connection between the frame 11 and a bracket 16 which in turn is pivotally connected by a pin 17 to a second bracket 18. The bracket 18 is pivotally connected by a pair of pins 19 (see also Fig. 4) to the main frame of the tractor indicated at 20. This universal connection permits turning of the tractor relative to the trailer as well as lateral and longitudinal rocking during travel over uneven surfaces.

The body 10 is secured to the trailer frame 11 by means of latches, two of which are disposed on each side of the body. As is best illustrated in Fig. 2, each of the latches comprises a pin 22 carried by the trailer body 10 and adapted to be received in a saddle 23 rigidly secured to the frame 11. The pin is normally held in the saddle by means of a latch lever 24 pivotally secured to the saddle 23 by a pin 26. The latch 24 is adapted to be rocked out of engagement with the pin to permit tipping of the body relative to the frame, by means of an air actuated cylinder 27 rigidly secured to the frame by means of a bracket 28. The air cylinder 27 comprises a flexible diaphragm 29, connected to the latch 24 by a link 31. Thus air under pressure admitted to the cylinder through a pipe 32 will rock the latch out of engagement with the pin 22. A spring 33 is interposed between the diaphragm and the cylinder opposing the action of the air pressure and normally urging the latch toward its engaged position.

Tilting of the dump body is accomplished by releasing the latches on one side of the body and rocking it about its latched connections on the opposite side by means of a pair of hydraulically actuated jacks illustrated at 35 in Fig. 1. One jack is disposed at each end of the body. The jacks are disposed on the longitudinal center line of the trailer body and each is connected at one end to the trailer frame by a universal connection 36 and at its opposite end by a ball and socket connection 37 to a projecting part 38 of the trailer body. Flexible pipes 39 are provided to transmit fluid under pressure to the jacks from a suitable tank, pump, and control valve (not shown) carried on the tractor within easy reach of the operator.

In a two-wheel trailer of this type, difficulty is frequently encountered with the entire trailer becoming unbalanced and turning over on its side during dumping of the body. This difficulty arises from the fact that the trailer frame is connected to the tractor by a universal connection and is the cause of considerable lost time in returning the trailer to an upright position as well as endangering personnel. Over-turning of the trailer is prevented by providing an automatically operable locking mechanism between the brackets 16 and 18 to prevent relative rocking movement during the unloading operation. As is best illustrated in Figs. 3 and 4, this may be accomplished by the provision of a plunger 41 adapted for reciprocal sliding movement in a bore 42 provided in the bracket 16. The plunger is actuated by an air cylinder 27a identical to that illustrated at 27 in Fig. 2 and is adapted to be extended through one of a plurality of slots 43 provided in an arcuate guide plate 44. The guide plate 44 extends through an opening 45 in the bracket 16 and its ends are rigidly secured by bolts 46 to angle braces 47. The angle braces 47 are secured to the bracket 18 and to rearwardly extending arms 48 also secured to the bracket 18. The arms 48 act as stops to engage the trailer frame 11 to prevent jack-knifing of the trailer relative to the tractor. During normal operation, the plunger 41 is held in a retracted position as illustrated in Fig. 3 permitting free rocking movement of the trailer relative to the tractor, however, during unloading operations the cylinder 27a may be actuated by air pressure to extend the plunger through any one of the slots 43 and thus prevent rocking of the trailer frame relative to the tractor. A plurality of slots 43 are provided in the guide plate 44 to insure that the plunger 41 will engage one of the slots in the event that the trailer is disposed at an angle relative to the tractor at the time the plunger is extended.

In Fig. 6 a preferred fluid circuit for actuating the air cylinders associated with the latches and locking mechanism in their proper sequence is illustrated schematically. The circuit comprises an inlet pipe 50 providing communication between a suitable source of air under pressure (not shown) and a rotary type control valve 51 which may be disposed within easy reach of the tractor operator. The control valve 51 may be manipulated to provide communication between the inlet pipe 50 and the pipe 32 communicating with the air cylinders 27 associated with the latches on one side of the trailer body or with a pipe 32' associated with the latches on the opposite side of the trailer body. When the valve is moved to provide communication with either of these pipes the opposite pipe is vented to the atmosphere by way of vent pipes 52 or 52'. The control valve may also be moved to the position illustrated in which both of pipes 32 and 32' are open to the atmosphere and pipe 50 is closed. The air cylinder 27a associated with the locking plunger 41 is connected to both of the pipes 32 and 32' by means of a pressure actuated shuttle valve 53 having a valve element 54 adapted for sliding movement in a bore 55. The valve element is actuated by air pressure to permit communication between the pipe receiving air pressure and the cylinder and to prevent communication between the cylinder and the pipe vented to the atmosphere. In operation, when air is directed to the cylinders associated with the latches on either side of the trailer body, the plunger 41 is automatically extended locking the trailer frame and the tractor against relative rocking movement.

Provision is also made to prevent overstressing of the flexible air and hydraulic pipes which form connections between the tractor and trailer. This is accomplished by the provision of a swinging frame 56 (Figs. 3 and 5) pivotally supported from the bracket 16 by a pin 57. A junction block 58 is rigidly secured to the frame 56 and serves as a solid coupling interposed in flexible air pipes 60 and 61 which connect with the lines 32 and 32' shown in Fig. 6. A similar junction block for the flexible hydraulic pipes 39 is provided by a pair of non-flexible pipes 59 rigidly secured to the frame 56. The frame is adapted to swing forwardly toward the tractor during turning relative to the trailer thus increasing the bending radius of the pipes as illustrated by the phantom lines in Fig. 5. This forward swinging of the bracket is caused by the natural tendency of the resilient pipes to assume straight positions.

I claim:

1. In a dump trailer having a frame adapted to be drawn by a tractor through a connection which permits lateral rocking of the frame relative to the tractor, a body carried by the frame, means to tip the body sidewise for discharging its contents, and means to latch the frame to the tractor against such lateral rocking during tipping of the body.

2. In a dump trailer having a frame adapted to be drawn by a tractor through a connection which permits lateral rocking of the frame relative to the tractor, a body carried by the frame, means to latch the body to the frame, means operable selectively to release the body for tipping toward either side, means to tip the body sidewise for discharging its contents, and means to latch the frame to the tractor against such lateral rocking during tipping of the body.

3. In a dump trailer having a frame adapted to be drawn by a tractor through a connection which permits lateral rocking of the frame relative to the tractor, a body carried by the frame, means to latch the body to the frame, means operable selectively to release the body for tipping toward either side, means to tip the body sidewise for discharging its contents, and means to latch the frame and tractor against relative rocking during tipping of the body.

4. In a dump trailer having a frame adapted to be drawn by a tractor through a connection which permits lateral rocking of the frame relative to the tractor, a body carried by the frame, means to latch the body to the frame, means operable selectively to release the body for tipping toward either side, means to tip the body sidewise for discharging its contents, and means operable automatically upon actuation of said selective releasing means to latch the frame against lateral rocking relative to the tractor.

5. In a dump trailer having a frame adapted to be drawn by a tractor through a connection which permits lateral rocking of the frame relative to the tractor, a body carried by the frame, releasable latch means for securing the body to the frame, fluid actuated means for selectively releasing the latch means, means to tip the body sidewise for discharging its contents, and means to latch the frame and tractor against relative lateral rocking during tipping of the body.

6. In a dump trailer having a frame adapted to be drawn by a tractor through a connection which permits lateral rocking of the frame relative to the tractor, a body carried by the frame, releasable latch means for securing the body to the frame, fluid actuated means for selectively releasing the latch means, means to tip the body sidewise for discharging its contents, means to latch the frame and tractor against relative lateral rocking during tipping of the body and control means on the tractor for selectively actuating said latching means and said means for tipping the body toward either side.

7. In a dump trailer having a frame adapted to be drawn by a tractor through a connection which permits lateral rocking of the frame relative to the tractor as well as turning of the tractor relative to the trailer for steering, a body carried by the frame, fluid actuated means to tip the body sidewise for discharging its contents, flexible piping extending from said fluid actuated tipping means on the trailer to a control valve carried by the tractor, a frame supporting the flexible piping at the connection between the tractor and trailer frame, and a pivotal connection between the frame supporting the flexible pipes at the connection between the tractor and trailer to permit forward swinging of the frame supporting the flexible pipes toward the tractor when the tractor is turned relative to the trailer frame.

CARL A. GUSTAFSON.

REFERENCES CITED

The following references are of record in the file of this patent:

UNITED STATES PATENTS

| Number | Name | Date |
| --- | --- | --- |
| 2,072,998 | Allin | Mar. 9, 1937 |
| 2,233,193 | Armington et al. | Feb. 25, 1941 |
| 2,321,198 | Graves | June 8, 1943 |
| 2,350,141 | Wood | May 30, 1944 |
| 2,451,294 | McGee | Oct. 12, 1948 |